United States Patent
Liang et al.

(10) Patent No.: US 11,994,863 B2
(45) Date of Patent: May 28, 2024

(54) TRAJECTORY SIMILARITY SEARCH

(71) Applicant: INTERNATIONAL BUSINESS MACHINES CORPORATION, Armonk, NY (US)

(72) Inventors: Qi Liang, Shanghai (CN); Peng Zhao, Mianyang (CN); Weixiong Rao, Shanghai (CN); Hong Min, Poughkeepsie, NY (US); Gong Su, New York, NY (US); Tian Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/701,228

(22) Filed: Dec. 3, 2019

(65) Prior Publication Data

US 2021/0165410 A1  Jun. 3, 2021

(51) Int. Cl.
  *G05D 1/00*  (2024.01)
  *G01C 21/36*  (2006.01)
  *G06F 16/901*  (2019.01)
  *G06F 16/903*  (2019.01)

(52) U.S. Cl.
  CPC ......... *G05D 1/0212* (2013.01); *G01C 21/367* (2013.01); *G05D 1/0027* (2013.01); *G05D 1/0287* (2013.01); *G06F 16/9027* (2019.01); *G06F 16/903* (2019.01)

(58) Field of Classification Search
  None
  See application file for complete search history.

(56) References Cited

U.S. PATENT DOCUMENTS

| 9,747,805 B2 | 8/2017 | Deshpande | |
| 2015/0039217 A1* | 2/2015 | Deshpande | G08G 1/20 701/300 |
| 2017/0030723 A1* | 2/2017 | Ding | G09B 29/106 |

FOREIGN PATENT DOCUMENTS

| CN | 102880719 A | | 1/2013 |
| CN | 102651020 B | * | 1/2014 |
| CN | 103593430 A | | 2/2014 |

(Continued)

OTHER PUBLICATIONS

Zhiming Ding, machine translated CN102651020B, 2014 (Year: 2014).*

(Continued)

*Primary Examiner* — Hongye Liang
(74) *Attorney, Agent, or Firm* — Rakesh Roy

(57) ABSTRACT

A computer-implemented method, a computer system, and a computer program product for trajectory similarity search is provided. The present invention may include, in response to receiving, by one or more processors, a search request for at least one trajectory similar to a query trajectory, determining, by one or more processors, a respective similarity between a query trajectory and a plurality of trajectories by calculating, in a synchronized way, a spatial distance measure and a time difference measure between the query trajectory and the plurality of trajectories. The present invention may further include, identifying, by one or more processors, the at least one trajectory from the plurality of trajectories based on the respective similarity between the query trajectory and the plurality of trajectories.

20 Claims, 11 Drawing Sheets

(56) References Cited

FOREIGN PATENT DOCUMENTS

CN    106649656 A    5/2017
KR    100923723 B1   10/2009

OTHER PUBLICATIONS

Le Gruenwald et al., "TKSimGPU: A Parallel Top-K Trajectory Similarity Query Processing Algorithm for GPGPUS," 2015 IEEE International Conference on Big Data (Big Data), pp. 461-469.
Mell et al., "The NIST Definition of Cloud Computing", National Institute of Standards and Technology, Special Publication 800-145, Sep. 2011, 7 pages.
Pelekis, et al., "Similarity Search in Trajectory Databases," Computer Society, 14th International Symposium on Temporal Representation and Reasoning, IEEE, 2007, pp. 1-12.
Shang, et al., "Trajectory Similarity Join in Spatial Networks," Proceedings of the VLDB Endowment, vol. 10, No. 11, 2017, pp. 1178-1189.
Wikipedia, R-tree, https://en.wikipedia.org/wiki/R-tree, [accessed Dec. 3, 2019], pp. 1-9.

* cited by examiner

| LOCAL CANDIDATES OF S1 | LB | UB |
|---|---|---|
| b2 (T1) | 6.9 | 7.5 |
| K₁(T1, T2, T3) | 5.3 | 6.4 |
| a2 (T1) | 4.0 | 5.1 |
| ... | ... | ... |

1010

| LOCAL CANDIDATES OF S2 | LB | UB |
|---|---|---|
| K₁(T1, T2, T3) | 4.2 | 4.4 |
| b2(T1) | 3.7 | 4.1 |
| c1(T2) | 3.0 | 3.5 |
| ... | ... | ... |

1020

| LOCAL CANDIDATES OF S3 | LB | UB |
|---|---|---|
| d5(T3) | 4.1 | 5.8 |
| K₁(T1, T2, T3) | 3.4 | 4.0 |
| c5(T2) | 2.1 | 3.2 |
| ... | ... | ... |

1030

1040

| GLOBAL CANDIDATES | S1 | | S2 | | S3 | | SUM | |
|---|---|---|---|---|---|---|---|---|
| | LB | SB | LB | SB | LB | SB | LB | SB |
| T1 | 6.9 | 7.5 | 3.7 | 4.1 | 3.4 | 4.0 | 14 | 15.6 |
| T2 | 5.3 | 6.4 | 4.2 | 4.4 | 2.1 | 3.2 | 11.6 | 14 |
| ... | ... | ... | ... | ... | ... | ... | ... | ... |

FIG. 10

TRAJECTORY SIMILARITY SEARCH

BACKGROUND

The present disclosure relates to trajectory similarity analysis, and more specifically, to a method, a system, and a computer program product for trajectory similarity search.

With the boom of location-based services, a large volume of trajectories are generated. For example, Global Positioning System (GPS)-based trajectories of moving vehicles generates large volumes of trajectory data. Analysis of trajectory data have been used in various applications, such as, applications for: trajectory prediction, carpooling, route planning, and traffic analysis.

SUMMARY

Embodiments of the present invention disclose a computer-implemented method, a computer system, and a computer program product for trajectory similarity search. The present invention may include, in response to receiving, by one or more processors, a search request for at least one trajectory similar to a query trajectory, determining, by one or more processors, a respective similarity between a query trajectory and a plurality of trajectories by calculating, in a synchronized way, a spatial distance measure and a time difference measure between the query trajectory and the plurality of trajectories. The present invention may further include, identifying, by one or more processors, the at least one trajectory from the plurality of trajectories based on the respective similarity between the query trajectory and the plurality of trajectories.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 10 depicts a schematic diagram of an example for determining respective similarities between the query trajectory and the plurality of trajectories according to embodiments of the present disclosure.

Throughout the drawings, same or similar reference numerals represent the same or similar elements.

DETAILED DESCRIPTION

Figure 1:
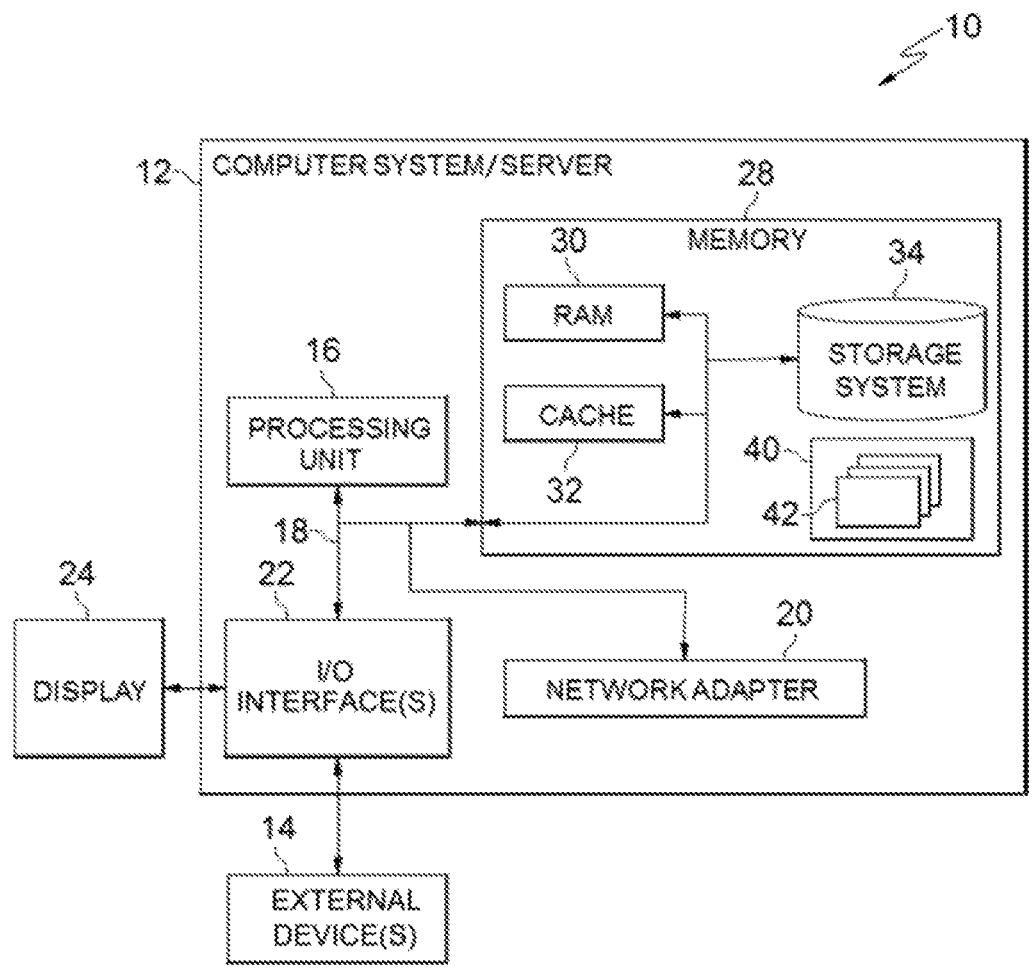
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
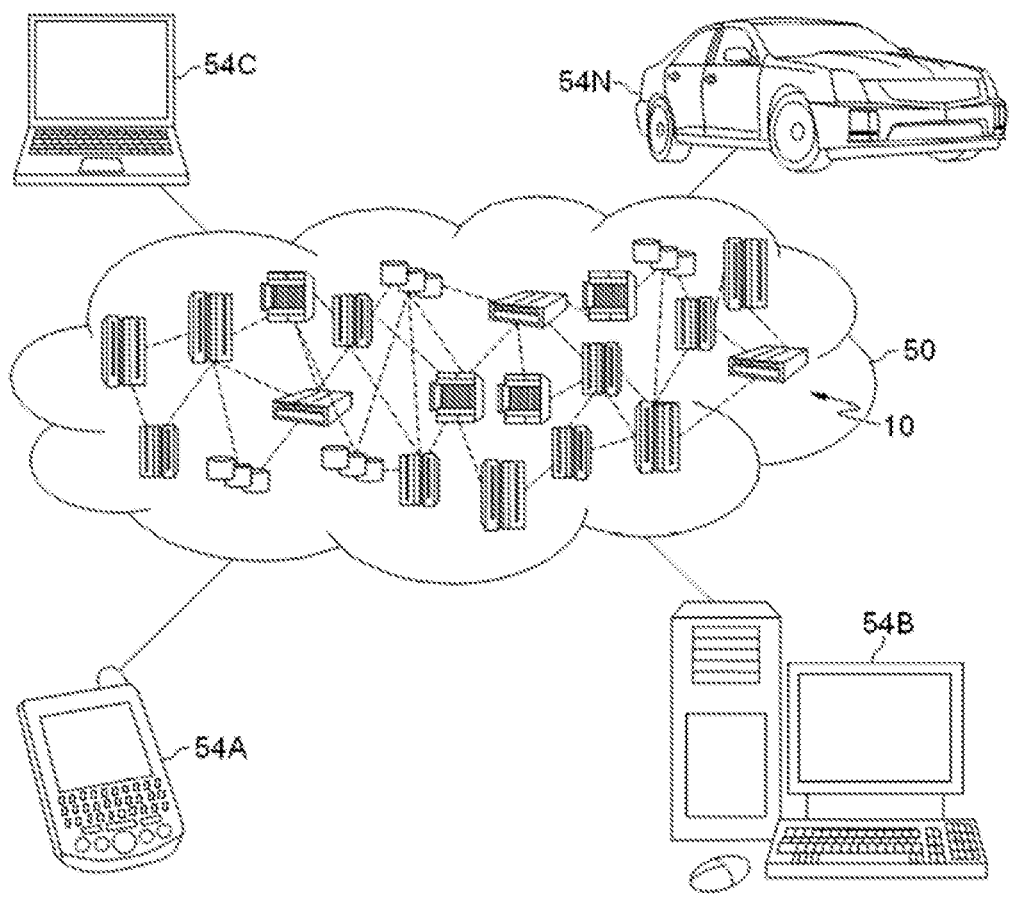
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
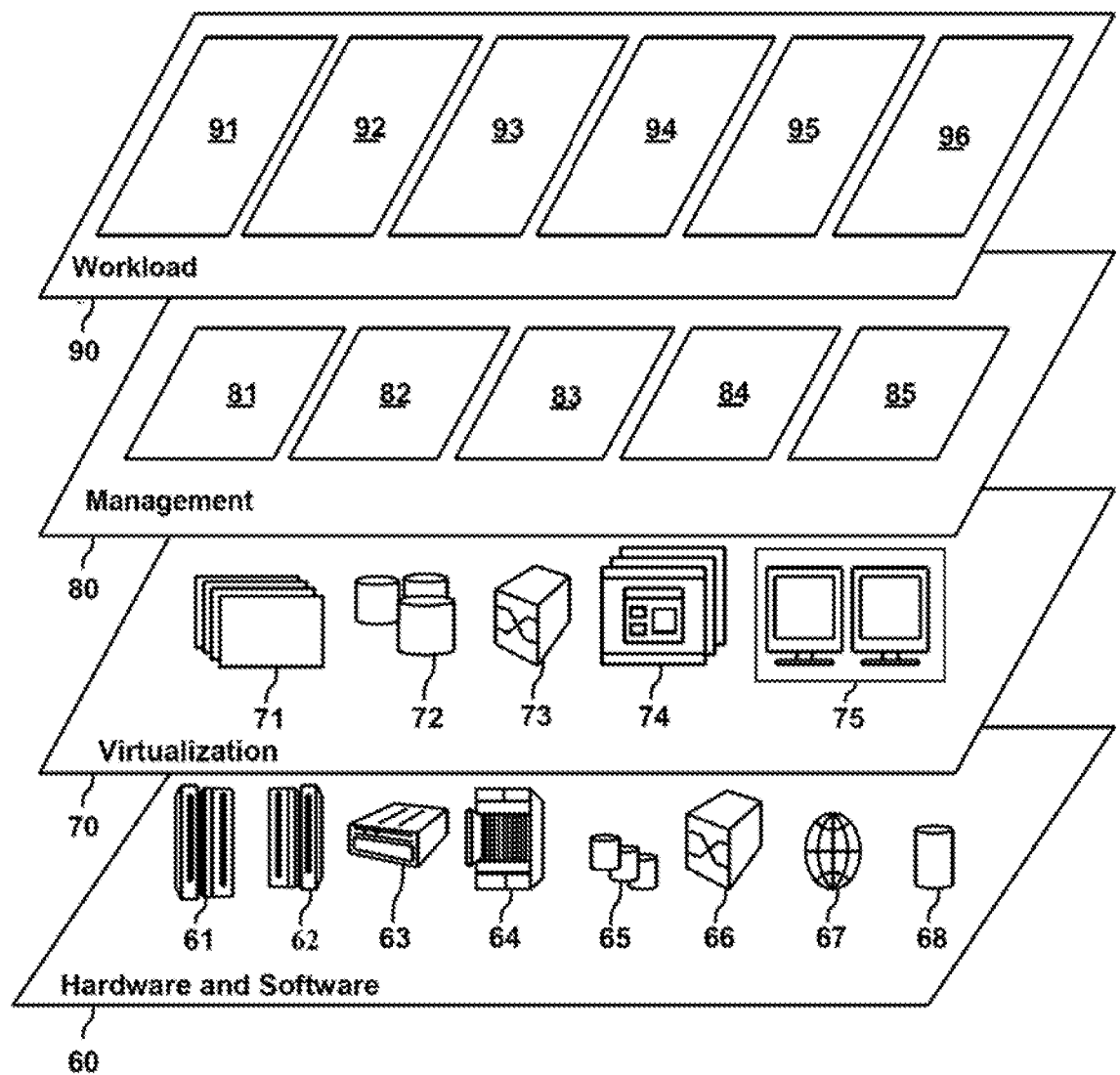
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trajectory similarity search 96. Hereinafter, reference will be made to FIGS. 4-11 to describe details of the trajectory similarity search 96.

As described previously, a large volume of trajectories are generated from location-based services. For example, Global Positioning System (GPS)-based trajectories of moving vehicles generates large volumes of trajectory data. Analysis of trajectory data have been used in various applications, such as, applications for: trajectory prediction, carpooling, route planning, and traffic analysis.

Effectively and efficiently searching a growing trajectory database for similar trajectories to a query trajectory is a challenging task. In order to measure a similarity between a query trajectory and another trajectory, some traditional schemes compute spatial similarity and temporal similarity independently, and then compute an overall similarity by summing the weighted spatial and temporal similarities. As such, two trajectories having a high spatial similarity, but a low temporal similarity may have the same overall similarity as another two trajectories having a high temporal similarity but a low spatial similarity.

Embodiments of the present disclosure address the problems described above by providing a new solution for conducting a search for trajectory similarity. In embodiments of the present disclosure, the similarity between two trajectories may be measured by synchronously matching their spatial distance against time difference. Further, with this new similarity measurement, a grid-based indexing of the trajectories and partitioning of the query trajectory may be enabled to overcome the challenge of searching for similar trajectories over a large number of trajectories. Thus, embodiments of the present disclosure improve the effectiveness and efficiency of searching for trajectory similarity.

Figure 4:
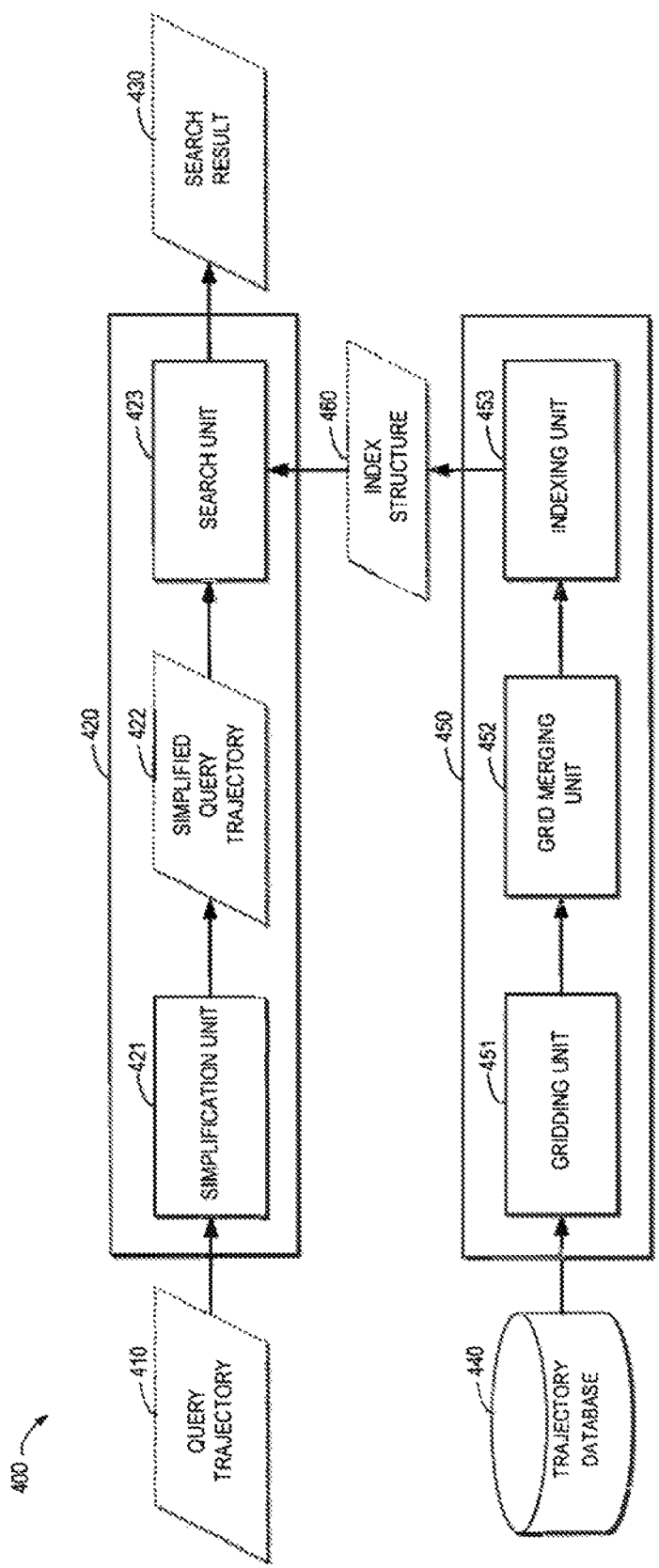
FIG. 4 depicts a system in which embodiments of the present disclosure can be implemented.

With reference now to FIG. 4, a system 400 in which embodiments of the present disclosure can be implemented is shown. It is to be understood that the structure and functionality of the system 400 are described only for the purpose of illustration without suggesting any limitations as to the scope of the present disclosure.

As shown in FIG. 4, the system 400 may generally comprise a similarity search apparatus 420 and a database processing apparatus 450. The similarity search apparatus 420 and/or the database processing apparatus 450 may be implemented by computer system/server 12 of FIG. 1. In some embodiments, the solution for trajectory similarity search may comprise two phases: an offline phase and an online phase.

During the offline phase, the database processing apparatus 450 may obtain a plurality of trajectories from a trajectory database 440 and generate an index structure 460 for indexing the plurality of trajectories. The index structure 460 may be provided to the similarity search apparatus 420 for the following trajectory similarity search. During the online phase, the similarity search apparatus 420 may receive a request to search for at least one trajectory similar to a query trajectory 410 from the plurality of trajectories in the trajectory database 440. The similarity search apparatus 420 may determine respective similarities between the query trajectory 410 and the plurality of trajectories based on the index structure 460, and select the at least one trajectory (such as, top-K most similar trajectories, where K≥1) from the plurality of trajectories based on the similarities between the query trajectory 410 and the plurality of trajectories. The similarity search apparatus 420 may present a search result 430 indicating the at least one trajectory similar to the query trajectory 410.

As shown in FIG. 4, the similarity search apparatus 420 may comprise a simplification unit 421 and a search unit 423. The database processing apparatus 450 may comprise a gridding unit 451, a grid merging unit 452 and an indexing unit 453. It is to be understood that the structures and functionalities of the similarity search apparatus 420 and/or the database processing apparatus 450 are described only for the purpose of illustration without suggesting any limitations as to the scope of the present disclosure. The similarity search apparatus 420 and/or the database processing apparatus 450 may include additional units not shown in FIG. 4 and/or omit some units shown in FIG. 4. For example, in some embodiments, the simplification unit 421 as shown in FIG. 4 can be omitted. Alternatively, or in addition, in some embodiments, the grid merging unit 452 as shown in FIG. 4 can be omitted.

In some embodiments, the simplification unit 421 may simplify the query trajectory 410, so as to generate the simplified query trajectory 422. The simplified query 422 may be provided to the search unit 423 for trajectory similarity search. In some embodiment, the query trajectory 410 may comprise a plurality of query points indicating respective locations of a moving object (such as, a moving vehicle) at different time points. The simplification unit 421 may partition the query trajectory 410 into a plurality of line segments by connecting a part of the locations. That is, the simplified query trajectory 422 can be represented by the plurality of line segments.

Figure 5:
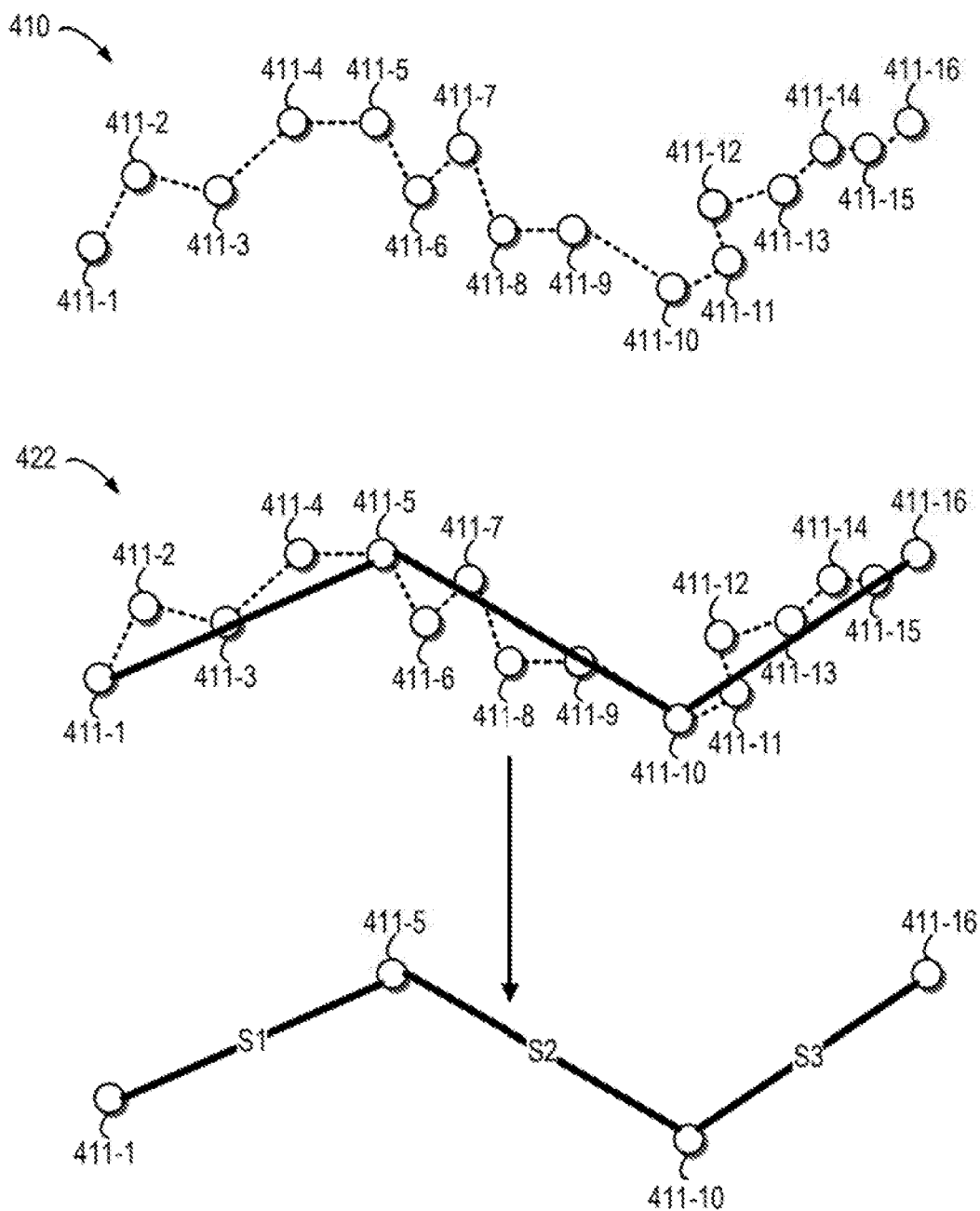
FIG. 5 depicts a schematic diagram of an example for simplifying the query trajectory according to embodiments of the present disclosure.

FIG. 5 depicts a schematic diagram of an example for simplifying the query trajectory according to embodiments of the present disclosure. As shown in FIG. 5, for example, the query trajectory 410 may include a plurality of query points 411-1, 411-2 . . . 411-16 (collectively referred to as "query points 411" or individually referred to as "query point 411"), each of which may represent a location where a moving object passed at a corresponding time point. For example, a query point 411 can be represented as $<p_i, t_i>$, where $t_i$ represents a time point and $p_i$ represents the location (such as, longitude and latitude coordinates) of a moving object at the time point $t_i$.

In some embodiments, the simplification unit 421 may connect a part of the query points 411, such as, the points 411-1, 411-5, 411-10 and 411-16 shown in FIG. 5, to generate the simplified query trajectory 422. In FIG. 5, for example, the simplified query trajectory 422 may include a line segment S1 which connects the points 411-1 and 411-5, a line segment S2 which connects the points 411-5 and 411-10, and a line segment S3 which connects the points 411-10 and 411-16.

The number of line segments in the simplified query trajectory 422 should be proper. If there are too many line segments, an excessive search cost will be caused in the following trajectory similarity search; while if there are too few line segments, many similar trajectories will be found in the following trajectory similarity search, resulting in a high candidate maintenance cost. In some embodiments, a cost model can be designed to approximately find the best simplification, so as to balance the search cost and the candidate maintenance cost. Any algorithm (such as, a greedy algorithm) currently known or to be developed in the future for implementing such cost model can be used. The scope of the present disclosure is not limited in this aspect.

With reference back to FIG. 4, in some embodiments, each of the plurality of trajectories in the trajectory database 440 may comprise a set of locations points indicating respective locations of a moving object (such as, a moving vehicle) at different time points and thus may be represented as a set of line segments connecting the set of locations points. In some embodiments, the gridding unit 451 may divide a three-dimensional spatial-temporal space into a first set of grids, and then map respective sets of line segments corresponding to the plurality of trajectories into the first set of grids. The grid merging unit 452 may merge a plurality of neighboring grids in the first set of grids shared by at least two of the plurality of trajectories, so as to generate a second set of grids. The indexing unit 453 may generate the index structure 460 for indexing the second set of grids and the plurality of trajectories mapped to the second set of grids.

Figure 6A:
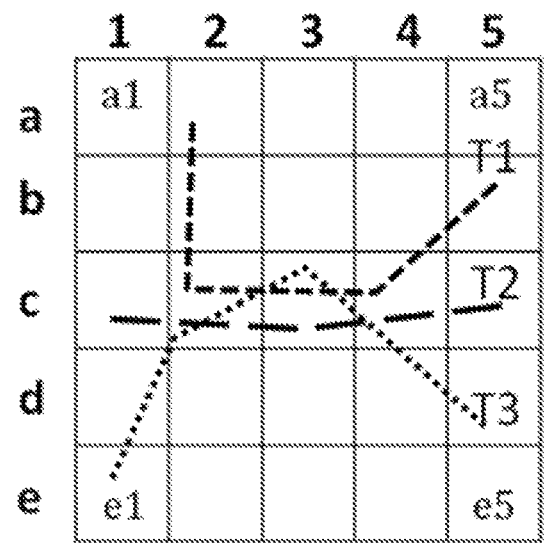
FIG. 6A depicts a schematic diagram of an example for mapping trajectories according to embodiments of the present disclosure.
Figure 6B:
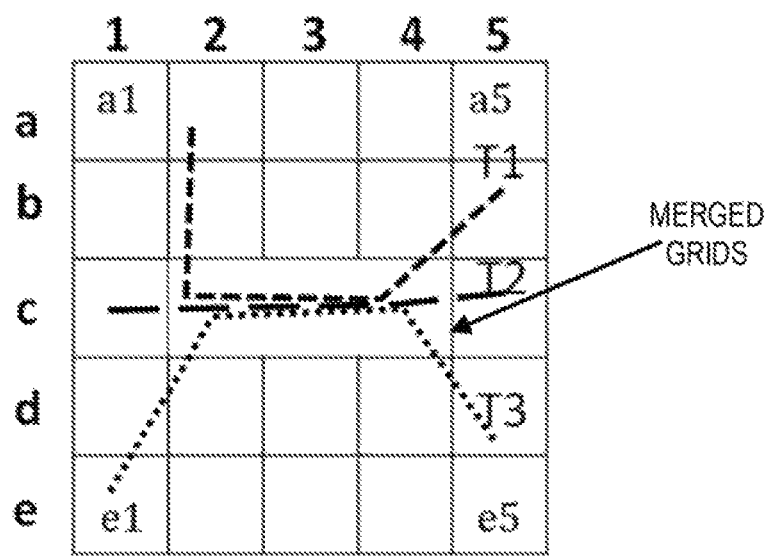
FIG. 6B depicts a schematic diagram of an example for merging grids according to embodiments of the present disclosure.

FIG. 6A depicts a schematic diagram of an example for mapping a plurality of trajectories into a set of grids according to embodiments of the present disclosure. In the example as shown in FIG. 6A, only for the purpose of simplicity, a set of grids divided from a two-dimensional space (for example, excluding a temporal dimension) are shown, which can be indexed as a1, a2 . . . a5, b1, b2 . . . b5, . . . , e1, e2 . . . e5. A plurality of trajectories T1, T2 and T3 are mapped to the set of grids. Taking the trajectory T2 as an example, T2 can be represented as: c1→c2→c3→c4→c5. It can be seen that, the grids c2, c3 and c4 are shared by the plurality of trajectories T1, T2 and T3. In some embodiments, in order to further accelerate the trajectory similarity search, neighboring grids shared by the plurality of trajectories can be merged into one grid. FIG. 6B depicts a schematic diagram of an example for merging grids according to embodiments of the present disclosure. As shown in FIG. 6B, the grids c2, c3 and c4 are merged into one grid, for example, represented as $K_1$. Taking the trajectory T2 as an example again, T2 can be represented as: c1→$K_1$→c5. Any algorithm currently known or to be developed in the further can be used for implementing such merging, including but not limited to a heuristic algorithm.

Figure 7:
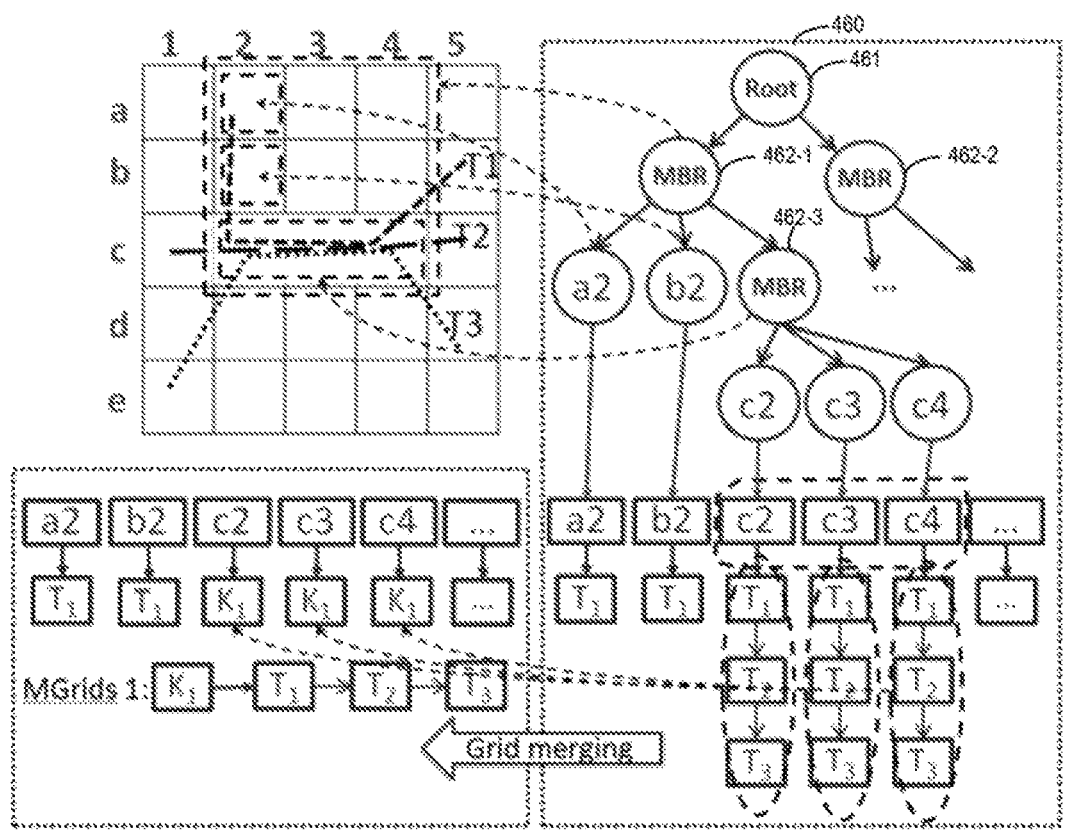
FIG. 7 depicts a schematic diagram of an example for indexing the grids and the plurality of trajectories according to embodiments of the present disclosure.

FIG. 7 depicts a schematic diagram of an example for indexing the grids and the plurality of trajectories according to embodiments of the present disclosure. As shown in FIG.

7, the trajectories T1, T2 and T3 have been mapped to the grids a1, a2 . . . a5, b1, b2 . . . b5, . . . , e1, e2 . . . e5, and the neighboring grids c2, c3 and c4 shared by the trajectories T1, T2 and T3 have been merged into one grid. Then, the indexing structure 460 can be built over all of the grids. In some embodiments, as shown in FIG. 7, the indexing structure 460 can be implemented by a R-tree. In the following, the indexing structure 460 can also be referred to as the R-tree 460. It is to be understood that, in other embodiments, the indexing structure 460 can be implemented by a different data structure.

As shown in FIG. 7, the R-tree 460 may include a root node 461, which represents all of the grids. The R-tree 460 may also include one or more Minimal Bounding Rectangle (MBR) nodes 462-1, 462-2 acting as child nodes of the root node 461, each containing at least one grid and/or at least one MBR node (such as, the MBR node 462-3). Each leaf node of the R-tree 460 may correspond to one grid. Further, each leaf node corresponding to a grid may be associated with an inverted list, which records identifiers of trajectories mapped to the grid. As shown in FIG. 7, for example, the inverted list associated with the grid a2 may record the identifier of the trajectory T1; the inverted list associated with the grid b2 may record the identifier of the trajectory T1; the inverted list associated with each of the grids c2, c3 and c4 may record the identifiers of the trajectories T1, T2 and T3; . . . and so on. Additionally, in some embodiments, in order to save storage space occupied by the index structure 460, the inverted lists associated with the grids can be further simplified. For example, in FIG. 7, each of the grids c2, c3 and c4 is associated with the same inverted list T1→T2→T3. By representing the inverted list T1→T2→T3 as $K_1$, the inverted lists associated with the grids can be further simplified, as shown in FIG. 7.

With reference back to FIG. 4, as described above, the simplified query trajectory 422 and the index structure 460 can be provided to the search unit 423 for trajectory similarity search. In some embodiments, the query trajectory 422 may correspond to a plurality of line segments (such as, the line segments S1, S2 and S3 as shown in FIG. 5). The search unit 423 may map the plurality of line segments into the grids indexed by the index structure 460. Then, for each of the plurality of line segments, the search unit 423 may determine at least one grid associated with the each of the plurality of line segments by searching the index structure 460, and determine at least one similarity between the line segment and the at least one grid.

Figure 8:
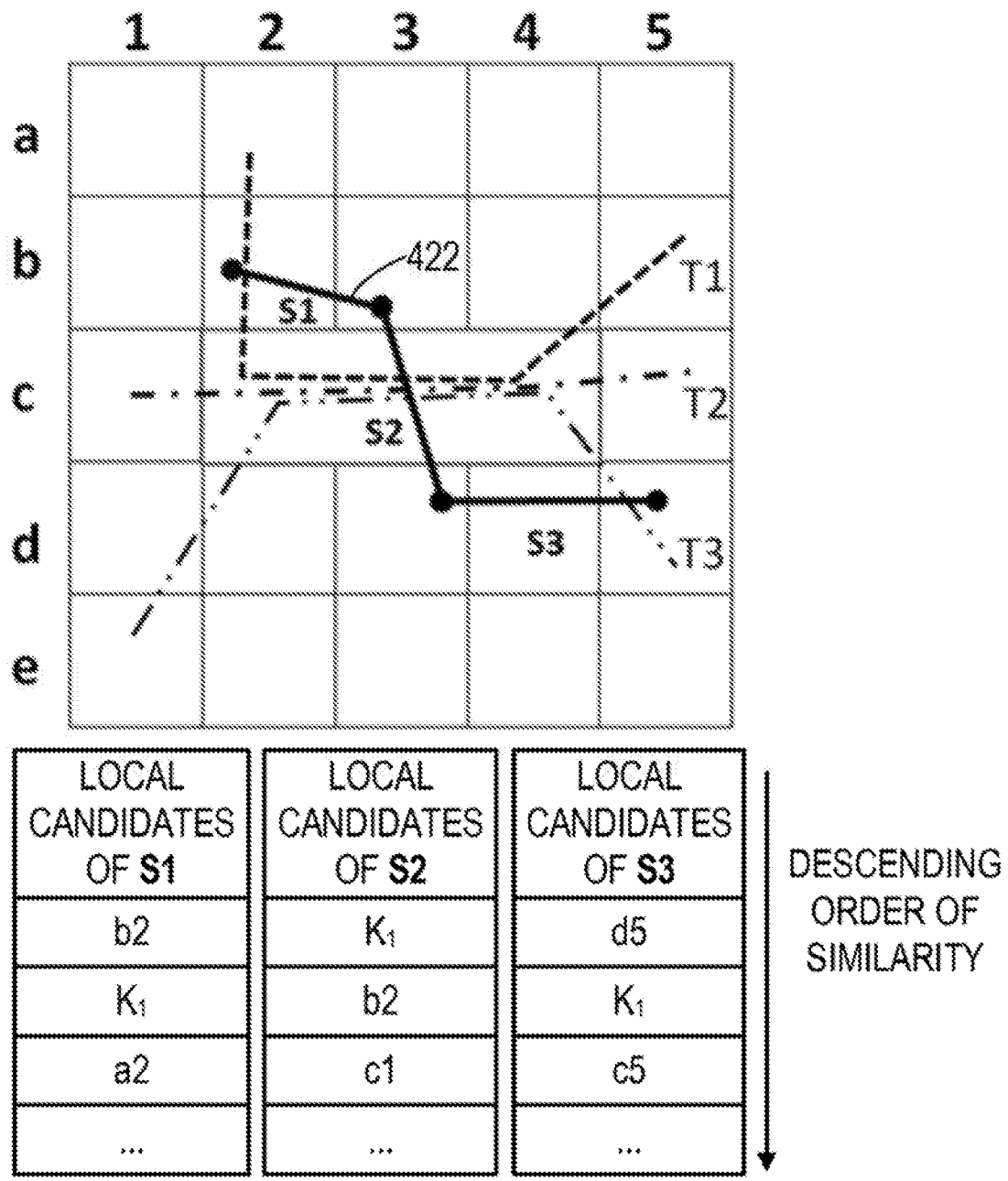
FIG. 8 depicts a schematic diagram of an example for trajectory similarity search according to embodiments of the present disclosure.

FIG. 8 depicts a schematic diagram of an example for trajectory similarity search according to embodiments of the present disclosure. As shown in FIG. 8, the line segments S1, S2 and S3 of the query trajectory 422 are mapped to the grids indexed by the index structure 460. At least one grid associated with each of the line segments S1, S2 and S3 can be determined by searching the index structure 460. As used herein, a grid associated with a line segment can also be referred to as a "local candidate" of the line segment. Then, at least one similarity between the each of the line segments S1, S2 and S3 and the at least one grid can be determined, as will be further described in detail with reference to FIGS. 9A-9B in the following. The local candidates of each of the line segments S1, S2 and S3 can be ranked based on similarities between the local candidates and the each of the line segments S1, S2 and S3. For example, as shown in FIG. 8, the local candidates of each of the line segments S1, S2 and S3 are ranked in descending order of similarity to the each of the line segments S1, S2 and S3.

In some embodiments, in order to determine a similarity between a line segment (such as, S1, S2 or S3) and a grid, the search unit 423 may determine, from the plurality of trajectories (such as, T1, T2 and T3), a trajectory mapped to the grid; and then determine a similarity between the line segment and the trajectory mapped to the grid. The search unit 423 may determine the similarity between the line segment and the grid based on the similarity between the line segment and the trajectory mapped to the grid.

Figure 9A:
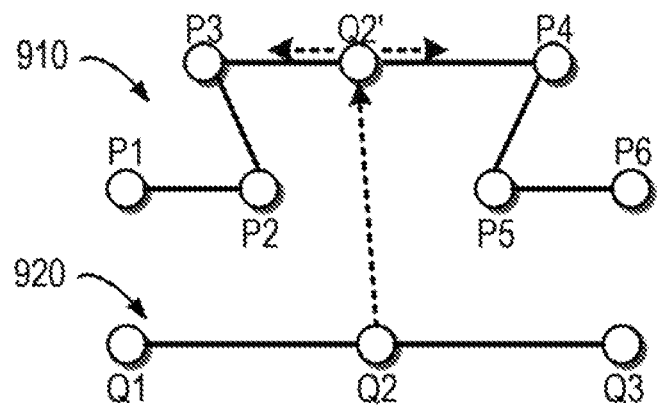
FIG. 9A depicts a schematic diagram of one example for measuring the similarity between two trajectories according to embodiments of the present disclosure.

FIG. 9A depicts a schematic diagram of an example for measuring the similarity between two trajectories 910 and 920 according to embodiments of the present disclosure.

As shown in FIG. 9A, the trajectory 910 includes a plurality of points P1, P2 . . . P6, while the trajectory 920 includes a plurality of points Q1, Q2 and Q3. Each point on the trajectories 910 and 920 may indicate a location (such as, longitude and latitude coordinates) and a time point. Taking the point Q2 on the trajectory 920 as an example, the search unit 423 may try to find another point Q2' on the trajectory 910 such that the similarity between the points Q2 and Q2' is maximized. The similarity between the points Q2 and Q2' can be determined as:

$$\theta * e^{-\Delta D} + (1-\theta) * e^{-\Delta T} \tag{1}$$

where $\Delta D$ represents a spatial distance between the points Q2 and Q2' (that is, the distance between the locations indicated by the points Q2 and Q2'), $\Delta T$ represents a time difference between the points Q2 and Q2' (that is, the time difference between the time points indicated by the points Q2 and Q2'), and $\theta \in [0,1]$ is a parameter to control the relative importance of the spatial and time differences. By maximizing the similarity as shown in the above formula (1), the search unit 423 can determine the point Q2' (such as, its location and time point) on the trajectory 910 which matches the point Q2 as well as their similarity. Likewise, for another point Q1 or Q3 on the trajectory 910, the search unit 423 can find a corresponding point Q1' or Q3' on the trajectory 910 and determine the similarity between the matching points. The similarity between the matching points can be used to determine the similarity between the trajectories 910 and 920. That is, in the embodiments of the present disclosure, the similarity between two trajectories can be determined by measuring the spatial distance and time difference between the two trajectories in a synchronized way.

In some embodiments, the search for matching points across two trajectories can be performed in a unidirectional way, as shown in FIG. 9A. Alternatively, in some embodiments, the search for matching points across two trajectories can be performed in a bidirectional way, as shown in FIG. 9B.

Figure 9B:
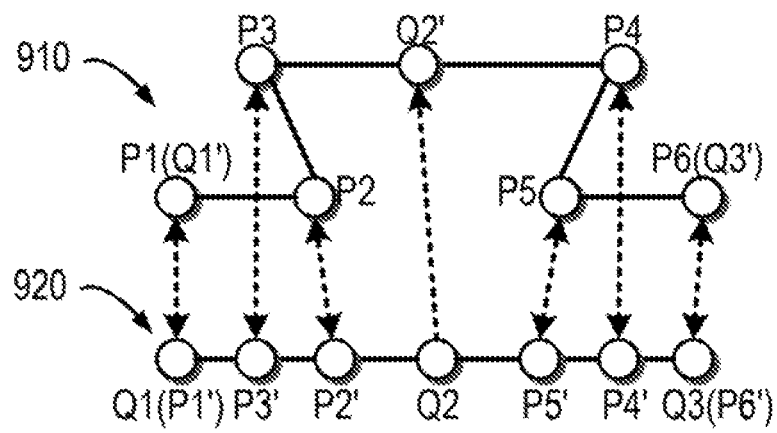
FIG. 9B depicts a schematic diagram of another example for measuring the similarity between two trajectories according to embodiments of the present disclosure.

As shown in FIG. 9B, for the points Q1, Q2 and Q3 on the trajectory 920, the search unit 423 may determine matching points Q1', Q2' and Q3' on the trajectory 910. Additionally, for the points P1, P2 . . . P6 on the trajectory 910, the search unit 423 may determine matching points P1', P2' . . . P6' on the trajectory 920. For example, as shown in FIG. 9B, 7 pairs of matching points can be found across the trajectories 910 and 920, which are (P1, Q1), (P3, P3'), (P2, P2'), (Q2', Q2), (P5, P5'), (P4, P4') and (P6, Q3).

In some embodiments, in response to determining pairs of matching points across the trajectories 910 and 920, the search unit 423 can determine the similarity between the trajectories 910 and 920 based on respective similarities of these matching point pairs. In some embodiments, the similarity between two trajectories can be determined as a value, for example, by aggregating respective similarities of matching point pairs. Alternatively, the similarity between two trajectories can be determined as a range defined by an upper bound and a lower bound. For example, the upper bound can be determined as the maximum one of the similarities of these matching point pairs; while the lower bound can be determined as the minimum one of the similarities of these matching point pairs.

As such, with reference back to FIG. 8, for each of the line segments S1, S2 and S3, respective similarities between the line segment and the local candidates of the line segment can be determined. Then, the search unit 423 can determine respective similarities between the query trajectory and the plurality of trajectories by aggregating the similarities between the plurality of line segments and their local candidates based on the index structure.

FIG. 10 depicts a schematic diagram of an example for determining respective similarities between the query trajectory and the plurality of trajectories according to embodiments of the present disclosure. In FIG. 10, for example, the similarity between a line segment and its local candidate is represented as a range defined by an upper bound (UB) and a lower bound (LB). It is to be understood that, this is merely for the purpose of illustration, without suggesting any limitations to the scope of the present disclosure.

As shown in FIG. 10, Table 1010 shows similarities between the line segment S1 and its local candidates. By searching the index structure 460 as shown in FIG. 7, the trajectory associated with each local candidate can be determined, as shown in Table 1010. Table 1020 shows similarities between the line segment S2 and its local candidates. Table 1030 shows similarities between the line segment S3 and its local candidates. The search unit 423 can determine respective similarities between the query trajectory 422 and the plurality of trajectories (also referred to as "global candidates" of the query trajectory 422) by aggregating the similarities between the line segments S1, S2, S3 and their local candidates. For example, if the similarity bounds of a local candidate of a line segment exceed predetermined thresholds, the local candidate will be popped out to a global candidate list as shown in Table 1040, where the original trajectory identifier associated with the local candidate will replace the identifier of the local candidate. The similarity between the query trajectory 422 and its global candidate can be determine by summing respective similarities between the line segments S1, S2, S3 and their local candidates in the global candidate list, as shown in Table 1040.

With reference back to FIG. 4, in some embodiments, in response to determining the similarities between the query trajectory 410 and the plurality of trajectories in the trajectory database 440, the search unit 423 may select the at least one trajectory (such as, top-K most similar trajectories, where K≥1) from the plurality of trajectories based on the determined similarities. The search unit 423 may then present the search result 430 indicating the at least one trajectory.

Figure 11:
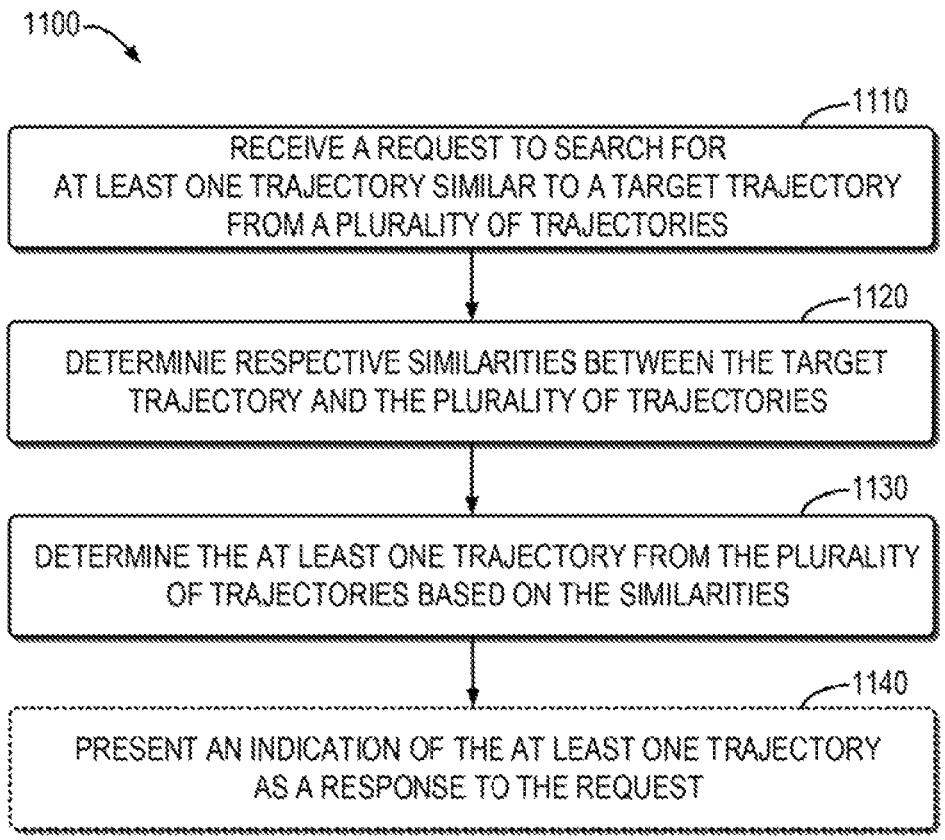
FIG. 11 is an operational flowchart illustrating a trajectory similarity search process according to embodiments of the present disclosure.

FIG. 11 depicts a flowchart of an example method 1100 for trajectory similarity search according to embodiments of the present disclosure. For example, the method 1100 may be implemented by computer system/server 12 of FIG. 1. It is to be understood that the method 1100 may also comprise additional blocks (not shown) and/or may omit the illustrated blocks. The scope of the present disclosure described herein is not limited in this aspect.

At block 1110, a method receives a request to search for at least one trajectory similar to a query trajectory from a plurality of trajectories.

At block 1120, respective similarities between the query trajectory and the plurality of trajectories are determined by measuring spatial distances and time differences between the query trajectory and the plurality of trajectories in a synchronized way.

At block 1130, the at least one trajectory is determined from the plurality of trajectories based on the similarities between the query trajectory and the plurality of trajectories.

Alternatively, or in addition, at block 1140, an indication of the at least one trajectory is presented as a response to the request.

In some embodiments, prior to determining the similarities between the query trajectory and the plurality of trajectories, the query trajectory is simplified.

In some embodiments, the query trajectory indicates a plurality of locations of a moving object at different time points, and simplifying the query trajectory comprises: dividing the query trajectory into a plurality of line segments by connecting a part of the plurality of locations.

In some embodiments, each of the plurality of trajectories indicates a set of locations of a moving object at different time points and corresponds to a set of line segments connecting the set of locations, and the method 1100 further comprises: prior to determining the similarities between the query trajectory and the plurality of trajectories, dividing a three-dimensional spatial-temporal space into a first set of grids; mapping respective sets of line segments corresponding to the plurality of trajectories into the first set of grids; generating a second set of grids by merging a plurality of neighboring grids in the first set of grids shared by at least two of the plurality of trajectories; and generating an index structure for indexing the second set of grids and the plurality of trajectories mapped to the second set of grids.

In some embodiments, the index structure includes a R-tree.

In some embodiments, the query trajectory indicates a plurality of locations of a moving object at different time points and corresponds to a plurality of line segments connecting the plurality of locations, and determining the similarities between the query trajectory and the plurality of trajectories comprises: mapping the plurality of line segments corresponding to the query trajectory into the second set of grids; for each of the plurality of line segments, determining at least one grid associated with the each of the plurality of line segments from the second set of grids by searching the index structure, and determining at least one similarity between the each of the plurality of line segments and the at least one grid; and deriving the similarities between the query trajectory and the plurality of trajectories from aggregating respective similarities determined for the plurality of line segments based on the index structure.

In some embodiments, determining the at least one similarity between the line segment and the at least one grid comprises: for each of the at least one grid, determining a trajectory mapped to the each of the at least one grid from the plurality of trajectories by searching the index structure; determining a similarity between the line segment and the trajectory; and determining a similarity between the line segment and the each of the at least one grid based on the similarity between the line segment and the trajectory.

In some embodiments, the line segment includes a first point indicating a first location and a first time point, and determining the similarity between the line segment and the trajectory comprises: determining a second point indicating a second location and a second time point from the trajectory by maximizing a first similarity between the first point and the second point, wherein the first similarity is determined based on a spatial distance between the first location and the second location and a time difference between the first time point and the second time point; and determining the similarity between the line segment and the trajectory based on the first similarity.

In some embodiments, the trajectory includes a third point indicating a third location and a third time point, and determining the similarity between the line segment and the trajectory comprises: determining a fourth point indicating a fourth location and a fourth time point from the line segment by maximizing a second similarity between the third point and the fourth point, wherein the second similarity is determined based on a spatial distance between the third location and the fourth location and a time difference between the third time point and the fourth time point; and determining the similarity between the line segment and the trajectory based on at least one of the first similarity and the second similarity.

It can be seen that, embodiments of the present disclosure provide a new solution for trajectory similarity search. In this solution, the similarity between two trajectories is measured by synchronously matching their spatial distance against time difference. Further, with this new similarity measurement, to overcome the challenge of search similar trajectories over a huge number of trajectories, grid-based indexing of the trajectories and partitioning of the query trajectory are enabled, so as to improve effectiveness and efficiency of trajectory similarity search.

It should be noted that the trajectory similarity search according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   mapping, by one or more processors, a plurality of trajectories stored in a trajectory database into a set of three-dimensional (3D) grids based on respective 3D spatial-temporal data of the plurality of trajectories;
   merging, by the one or more processors, a plurality of neighboring grids in the set of 3D grids that are shared by at least two trajectories of the plurality of trajectories into a merged grid;
   generating, by the one or more processors, a searchable grid-based index structure in the trajectory database based on indexing the plurality of trajectories mapped to the set of 3D grids, wherein the searchable grid-based index structure includes the merged grid as a pointer that references the plurality of neighboring grids shared by the at least two trajectories, and wherein the merged grid is configured to accelerate a search request for at least one trajectory from the plurality of trajectories stored in the trajectory database that is similar to a query trajectory;
   in response to receiving, by the one or more processors, the search request for the at least one trajectory similar to the query trajectory based on Global Positioning System (GPS) data of a moving object, determining, by the one or more processors, a respective similarity between the query trajectory of the moving object and the plurality of trajectories based on other GPS data of other moving objects by concurrently using a spatial distance measure and a time difference measure between the query trajectory of the moving object and the plurality of trajectories of the other moving objects to synchronously match the spatial distance measure against the time difference measure between the query trajectory of the moving object and the plurality of trajectories of the other moving objects; and
   searching, by the one or more processors, the searchable grid-based index structure in the trajectory database to identify the at least one trajectory stored in the trajectory database from the plurality of trajectories of the other moving objects based on the respective similarity between the query trajectory of the moving object and the plurality of trajectories of the other moving objects.

2. The method of claim 1, wherein determining the respective similarity between the query trajectory and the plurality of trajectories further comprises:
   simplifying, by the one or more processors, the query trajectory.

3. The method of claim 2, wherein the query trajectory includes a plurality of locations associated with the moving object at different time points, and simplifying the query trajectory further comprises:
   dividing, by the one or more processors, the query trajectory into a plurality of line segments by connecting a part of the plurality of locations.

4. The method of claim 1, wherein each trajectory of the plurality of trajectories includes a set of locations associated with a first moving object at different time points and corresponds to a set of line segments connecting the set of locations, and the method further comprising:
   dividing, by the one or more processors, a 3D spatial-temporal space into a first set of grids;
   mapping, by the one or more processors, respective sets of line segments corresponding to the plurality of trajectories into the first set of grids;
   generating, by the one or more processors, a second set of grids by merging the plurality of neighboring grids in the first set of grids shared by the at least two trajectories of the plurality of trajectories; and
   generating, by the one or more processors, the grid-based index structure for indexing the second set of grids and the plurality of trajectories mapped to the second set of grids.

5. The method of claim 4, wherein the grid-based index structure includes an R-tree.

6. The method of claim 4, wherein the query trajectory includes a plurality of locations associated with a second moving object at different time points and corresponds to a plurality of line segments connecting the plurality of locations, and determining the respective similarity between the query trajectory and the plurality of trajectories further comprises:
   mapping, by the one or more processors, the plurality of line segments corresponding to the query trajectory into the second set of grids;
   determining, by the one or more processors, at least one grid associated with a corresponding line segment of the plurality of line segments from the second set of grids by searching the grid-based index structure;
   determining, by the one or more processors, at least one similarity between the corresponding line segment of the plurality of line segments and the at least one grid; and deriving, by the one or more processors, the respective similarity between the query trajectory and the plurality of trajectories from aggregating respective similarities determined for the plurality of line segments based on the grid-based index structure.

7. The method of claim 6, wherein determining the at least one similarity between the corresponding line segment of the plurality of line segments and the at least one grid further comprises:
determining, by the one or more processors, a trajectory mapped to each grid of the at least one grid from the plurality of trajectories by searching the grid-based index structure;
determining, by the one or more processors, a similarity between the corresponding line segment and the trajectory; and
determining, by the one or more processors, a similarity between the corresponding line segment and each grid of the at least one grid based on the similarity between the corresponding line segment and the trajectory.

8. The method of claim 7, wherein the corresponding line segment includes a first point indicating a first location and a first time point, and determining the similarity between the corresponding line segment and the trajectory further comprises:
determining, by the one or more processors, a second point indicating a second location and a second time point from the trajectory by maximizing a first similarity between the first point and the second point, wherein the first similarity is determined based on a spatial distance between the first location and the second location and a time difference between the first time point and the second time point; and
determining, by the one or more processors, the similarity between the corresponding line segment and the trajectory based on the first similarity.

9. The method of claim 8, wherein the trajectory includes a third point indicating a third location and a third time point, and determining the similarity between the corresponding line segment and the trajectory further comprises:
determining, by the one or more processors, a fourth point indicating a fourth location and a fourth time point from the corresponding line segment by maximizing a second similarity between the third point and the fourth point, wherein the second similarity is determined based on a spatial distance between the third location and the fourth location and a time difference between the third time point and the fourth time point; and
determining, by the one or more processors, the similarity between the corresponding line segment and the trajectory based on at least one of the first similarity and the second similarity.

10. The method of claim 1, further comprising:
presenting, by the one or more processors, an indication of the at least one trajectory as a response to the received search request.

11. A computer system for trajectory similarity search, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
mapping, by the one or more processors, a plurality of trajectories stored in a trajectory database into a set of three-dimensional (3D) grids based on respective 3D spatial-temporal data of the plurality of trajectories;
merging, by the one or more processors, a plurality of neighboring grids in the set of 3D grids that are shared by at least two trajectories of the plurality of trajectories into a merged grid;
generating, by the one or more processors, a searchable grid-based index structure in the trajectory database based on indexing the plurality of trajectories mapped to the set of 3D grids, wherein the searchable grid-based index structure includes the merged grid as a pointer that references the plurality of neighboring grids shared by the at least two trajectories, and wherein the merged grid is configured to accelerate a search request for at least one trajectory from the plurality of trajectories stored in the trajectory database that is similar to a query trajectory;
in response to receiving, by the one or more processors, the search request for the at least one trajectory similar to the query trajectory based on Global Positioning System (GPS) data of a moving object, determining, by the one or more processors, a respective similarity between the query trajectory of the moving object and the plurality of trajectories based on other GPS data of other moving objects by concurrently using a spatial distance measure and a time difference measure between the query trajectory of the moving object and the plurality of trajectories of the other moving objects to synchronously match the spatial distance measure against the time difference measure between the query trajectory of the moving object and the plurality of trajectories of the other moving objects; and
searching, by the one or more processors, the searchable grid-based index structure in the trajectory database to identify the at least one trajectory stored in the trajectory database from the plurality of trajectories of the other moving objects based on the respective similarity between the query trajectory of the moving object and the plurality of trajectories of the other moving objects.

12. The computer system of claim 11, wherein determining the respective similarity between the query trajectory and the plurality of trajectories further comprises:
simplifying, by the one or more processors, the query trajectory.

13. The computer system of claim 12, wherein the query trajectory includes a plurality of locations associated with the moving object at different time points, and simplifying the query trajectory further comprises:
dividing, by the one or more processors, the query trajectory into a plurality of line segments by connecting a part of the plurality of locations.

14. The computer system of claim 11, wherein each trajectory of the plurality of trajectories includes a set of locations associated with a first moving object at different time points and corresponds to a set of line segments connecting the set of locations, and the method further comprising:
dividing, by the one or more processors, a 3D spatial-temporal space into a first set of grids;
mapping, by the one or more processors, respective sets of line segments corresponding to the plurality of trajectories into the first set of grids;
generating, by the one or more processors, a second set of grids by merging the plurality of neighboring grids in the first set of grids shared by the at least two trajectories of the plurality of trajectories; and generating, by the one or more processors, the grid-based index structure for indexing the second set of grids and the plurality of trajectories mapped to the second set of grids.

15. The computer system of claim 14, wherein the grid-based index structure includes an R-tree.

16. The computer system of claim 14, wherein the query trajectory includes a plurality of locations associated with a second moving object at different time points and corresponds to a plurality of line segments connecting the plurality of locations, and determining the respective similarity between the query trajectory and the plurality of trajectories further comprises:

mapping, by the one or more processors, the plurality of line segments corresponding to the query trajectory into the second set of grids;

determining, by the one or more processors, at least one grid associated with a corresponding line segment of the plurality of line segments from the second set of grids by searching the grid-based index structure;

determining, by the one or more processors, at least one similarity between the corresponding line segment of the plurality of line segments and the at least one grid; and deriving, by the one or more processors, the respective similarity between the query trajectory and the plurality of trajectories from aggregating respective similarities determined for the plurality of line segments based on the grid-based index structure.

17. The computer system of claim 16, wherein determining the at least one similarity between the corresponding line segment of the plurality of line segments and the at least one grid further comprises:

determining, by the one or more processors, a trajectory mapped to each grid of the at least one grid from the plurality of trajectories by searching the grid-based index structure;

determining, by the one or more processors, a similarity between the corresponding line segment and the trajectory; and determining, by the one or more processors, a similarity between the corresponding line segment and each grid of the at least one grid based on the similarity between the corresponding line segment and the trajectory.

18. The computer system of claim 17, wherein the corresponding line segment includes a first point indicating a first location and a first time point, and determining the similarity between the corresponding line segment and the trajectory further comprises:

determining, by the one or more processors, a second point indicating a second location and a second time point from the trajectory by maximizing a first similarity between the first point and the second point, wherein the first similarity is determined based on a spatial distance between the first location and the second location and a time difference between the first time point and the second time point; and determining, by the one or more processors, the similarity between the corresponding line segment and the trajectory based on the first similarity.

19. The computer system of claim 18, wherein the trajectory includes a third point indicating a third location and a third time point, and determining the similarity between the corresponding line segment and the trajectory further comprises:

determining, by the one or more processors, a fourth point indicating a fourth location and a fourth time point from the corresponding line segment by maximizing a second similarity between the third point and the fourth point, wherein the second similarity is determined based on a spatial distance between the third location and the fourth location and a time difference between the third time point and the fourth time point; and determining, by the one or more processors, the similarity between the corresponding line segment and the trajectory based on at least one of the first similarity and the second similarity.

20. A computer program product for trajectory similarity search, the computer program product comprising:

one or more computer-readable tangible storage media and program instructions collectively stored on the one or more computer-readable tangible storage media, the program instructions comprising:

program instructions to, map, by the one or more processors, a plurality of trajectories stored in a trajectory database into a set of three-dimensional (3D) grids based on respective 3D spatial-temporal data of the plurality of trajectories;

program instructions to, merge, by the one or more processors, a plurality of neighboring grids in the set of 3D grids that are shared by at least two trajectories of the plurality of trajectories into a merged grid;

program instructions to, generate, by the one or more processors, a searchable grid-based index structure in the trajectory database based on indexing the plurality of trajectories mapped to the set of 3D grids, wherein the searchable grid-based index structure includes the merged grid as a pointer that references the plurality of neighboring grids shared by the at least two trajectories, and wherein the merged grid is configured to accelerate a search request for at least one trajectory from the plurality of trajectories stored in the trajectory database that is similar to a query trajectory;

program instructions to, in response to receiving, by the one or more processors, the search request for the at least one trajectory similar to the query trajectory based on Global Positioning System (GPS) data of a moving object, determine, by the one or more processors, a respective similarity between the query trajectory of the moving object and the plurality of trajectories based on other GPS data of other moving objects by concurrently using a spatial distance measure and a time difference measure between the query trajectory of the moving object and the plurality of trajectories of the other moving objects to synchronously match the spatial distance measure against the time difference measure between the query trajectory of the moving object and the plurality of trajectories of the other moving objects; and program instructions to search, by the one or more processors, the searchable grid-based index structure in the trajectory database to identify the at least one trajectory stored in the trajectory database from the plurality of trajectories of the other moving objects based on the respective similarity between the query trajectory of the moving object and the plurality of trajectories of the other moving objects.

\* \* \* \* \*